(12) United States Patent
Arthur et al.

(10) Patent No.: US 10,406,718 B2
(45) Date of Patent: *Sep. 10, 2019

(54) GUARD AND CONTROL APPARATUS FOR SAFE OPERATION OF A ROTARY CUTTER

(71) Applicants: Robert Arthur, Trenton, MI (US); Nicholas J. Russell, Kirtland, OH (US)

(72) Inventors: Robert Arthur, Trenton, MI (US); Nicholas J. Russell, Kirtland, OH (US)

(73) Assignee: G.A.W. Inc, Romulus, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,217

(22) Filed: Nov. 7, 2017

(65) Prior Publication Data

US 2018/0264677 A1 Sep. 20, 2018

Related U.S. Application Data

(63) Continuation-in-part of application No. 15/648,562, filed on Jul. 13, 2017, now Pat. No. 10,307,886.

(60) Provisional application No. 62/472,843, filed on Mar. 17, 2017.

(51) Int. Cl.
*B27G 19/04* (2006.01)
*B23D 45/16* (2006.01)
*B24B 55/05* (2006.01)
*B24B 23/02* (2006.01)

(52) U.S. Cl.
CPC ............ *B27G 19/04* (2013.01); *B23D 45/16* (2013.01); *B24B 55/052* (2013.01); *B24B 23/028* (2013.01)

(58) Field of Classification Search
CPC ..... B27G 19/04; B27G 19/02; Y10T 16/4713; B25F 5/02; B25F 5/026; B24B 55/052; B24B 55/04
USPC ........... 173/170; 83/478, 860, 397; 451/451, 451/452, 457, 344, 359; 16/426; 30/276, 30/298, 296.1, 391
See application file for complete search history.

(56) References Cited

U.S. PATENT DOCUMENTS

| 3,177,909 A * | 4/1965 | Laube | B27G 19/04 30/391 |
|---|---|---|---|
| 5,075,976 A | 12/1991 | Young | |
| 8,413,340 B2 | 4/2013 | Orlowski | |
| 2005/0215186 A1 * | 9/2005 | Stierle | B24B 23/02 451/359 |
| 2005/0252012 A1 | 11/2005 | Johnson, III | |

(Continued)

FOREIGN PATENT DOCUMENTS

JP 2018-34291 * 3/2018 ............... B25F 5/02

*Primary Examiner* — Laura M Lee
(74) *Attorney, Agent, or Firm* — Mark Navarre

(57) ABSTRACT

A power tool that drives rotary cutting element has a retractable guard for the cutting element, and a guard control apparatus allows a user to maintain the guard in a retracted position during operation of the power tool. The guard control apparatus includes an auxiliary handle fastened to the housing of the power tool, and latching elements linked to a spring-biased lever mounted in the auxiliary handle for selectively and temporarily retaining the retractable portion of the guard in a retracted position to enable plunge and other complex cutting operations. An alignment ring is selectively engaged by a user-manipulated alignment pin to rotationally lock the guard in one of a preset number of rotary orientations.

4 Claims, 6 Drawing Sheets

(56) References Cited

U.S. PATENT DOCUMENTS

2016/0297051 A1* 10/2016 Aiken ................. B24B 55/052

* cited by examiner

GUARD AND CONTROL APPARATUS FOR SAFE OPERATION OF A ROTARY CUTTER

RELATED APPLICATIONS

This application is a continuation-in-part of pending non-provisional U.S. patent application Ser. No. 15/648,562 filed Jul. 13, 2017.

TECHNICAL FIELD

This invention relates to pneumatic or electric rotary cutter power tools, and more particularly to a guard and guard control apparatus for improving the safety of workers using such power tools.

BACKGROUND OF THE INVENTION

Rotary cutter power tools of the pneumatic or electric variety are used in many industrial applications that require a worker to manually cut heavy material such as plate steel or aluminum. The cutting element can be an abrasive disk or a toothed wheel, depending on the application. Even when used by skilled operators, such cutting tools can be hazardous due to flying debris and a phenomenon known as kick-back, where the business end of the power tool suddenly jumps away from the workpiece. Safety guards that partially enclose the cutting element can reduce the risk of user injury to a great degree, but can also interfere with the desired use of the tool. For example, when the worker needs to make a plunge cut (that is, where the cutting element is brought into contact with a non-marginal portion of the workpiece) or other complex cut, the guard must first be retracted to expose the leading portion of the cutting element.

One way of addressing the above-described problem is disclosed in the U.S. Pat. No. 5,075,976 to Young, issued on Dec. 31, 1991. As shown by Young, a guard retainer releasably holds a movable portion of a saw guard in a retracted position exposing a portion of the saw blade during operation of the saw. A lever located adjacent the tool handle is depressed by the user to hold the guard retainer in a latching position against an opposing bias force so that when the user releases the lever, the movable portion of the guard returns to its un-retracted position covering the saw blade. Locating the lever adjacent the handle is said to be advantageous in that it allows single-handed operation of the tool, but single-handed use of many power cutting tools can in practice expose the user's free hand to unnecessary risk, particularly in the event of a sudden kick-back. Accordingly, what is needed is a guard positioning mechanism that allows the user to safely operate the power tool, and in particular, to avoid injury in the event of a sudden kickback.

SUMMARY OF THE INVENTION

The present invention is directed to an improved guard and guard control apparatus for a rotary cutting power tool that gives the user greater control over the power tool, while keeping both hands of the user away from the cutting element in the event of a sudden kickback. The guard includes a retractable portion, and the guard control apparatus includes an auxiliary handle (that is, a secondary handle used to stabilize and help support the tool driver) fastened to the housing of the power tool, a spring-biased lever, and latching elements mounted in the auxiliary handle for selectively and temporarily latching the retractable portion of the guard in a retracted position to enable plunge and other complex cutting operations. When the user releases the spring-biased lever on the auxiliary handle, the retractable portion of the guard is released and returns to its default or un-retracted position.

Maintaining the retractable portion of the guard in the retracted position during operation of the power tool in this manner occupies both hands of the user. This not only helps the user stabilize and accurately control the power tool, but also keeps both of the user's hands safely away from the exposed cutting element in the event of a sudden kickback.

Advantageously, the guard control apparatus is configured to allow the user to select one of several possible retracted positions of the retractable portion of the guard. In addition, the rotary alignment of the entire guard assembly with respect to the cutting element can be selected to accommodate the desired cutting operation without affecting the guard latching operation of the spring-biased lever. In the embodiment that is the subject of the present invention, the rotary alignment of the guard assembly is determined by a user-manipulated alignment pin that engages one of several slots formed in an alignment ring fastened to the fixed portion of the guard. The alignment pin is slidably mounted in a mounting plate disposed between the auxiliary handle and the housing of the power tool, and the user can change the alignment of the guard assembly by temporarily lifting the alignment pin out of engagement with the alignment ring, and then engaging the alignment pin with a different alignment ring slot.

DESCRIPTION OF THE PREFERRED EMBODIMENT

Figure 1A:
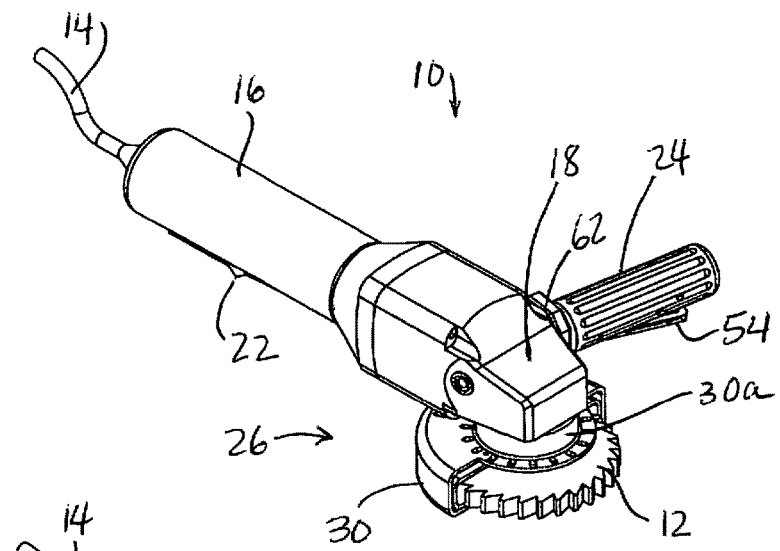
FIG. 1A is an isometric view of rotary cutting power tool equipped with a guard mechanism and control apparatus according to a first embodiment of the invention, with the retractable portion of the guard mechanism in a fully retracted position.

In general, the improved guard and guard control apparatus of this invention is applicable to any electric or air powered rotary cutting power tool. For purposes of illustration, and referring for example to FIGS. 1A-1C, the apparatus of this invention is utilized in connection with an electric angle grinder power tool 10 equipped with a cutting element 12 such as a toothed wheel. The illustrated power tool 10 has a power cord 14, a tubular rear housing 16 that is grasped with the user's left hand, a front housing 18 that is fastened to the rear housing 16, and a spindle 19 and output shaft 20 oriented perpendicular to the rear and front housings 16 and 18, the cutting element 12 being mounted on the output shaft 20. In general, the rear housing 16 encloses an electric motor and control circuitry, whereas the front housing 18 encloses a gearing mechanism that couples the rotor of the electric motor to the output shaft 20. A lever-style on/off switch 22 is mounted on the underside of the front housing 16, and can be actuated by the fingers of the user's hand to turn the power tool 10 on and off. An auxiliary handle 24 is fastened to the left side of the front housing 18 so as to be grasped by the user's left hand during operation of the power tool 10, leaving the user's right hand free to grasp the rear housing (and switch 22). Optionally, the auxiliary handle 24 can be fastened to the right side of the front housing 18, in which case, the user's left hand grasps the rear housing 16 (and switch 22), and the user's right hand grasps the auxiliary handle 24.

A guard mechanism, generally designated by the reference numeral 26, is fastened to the spindle 19 for at least partially enclosing the cutting element 12. The guard mechanism 26 includes a first (inner) portion 28 that encloses one half of the cutting element 12, and a second (outer) portion 30 that selectively encloses the other half of the cutting element 12. In use, the first guard portion 28 is fixed with respect to the spindle 19, and is therefore also referred to herein as the fixed guard portion. The second guard portion 30, on the other hand, is rotatably mounted on the first guard portion 28, and is therefore also referred to herein as the movable or retractable guard portion.

Figure 2A:
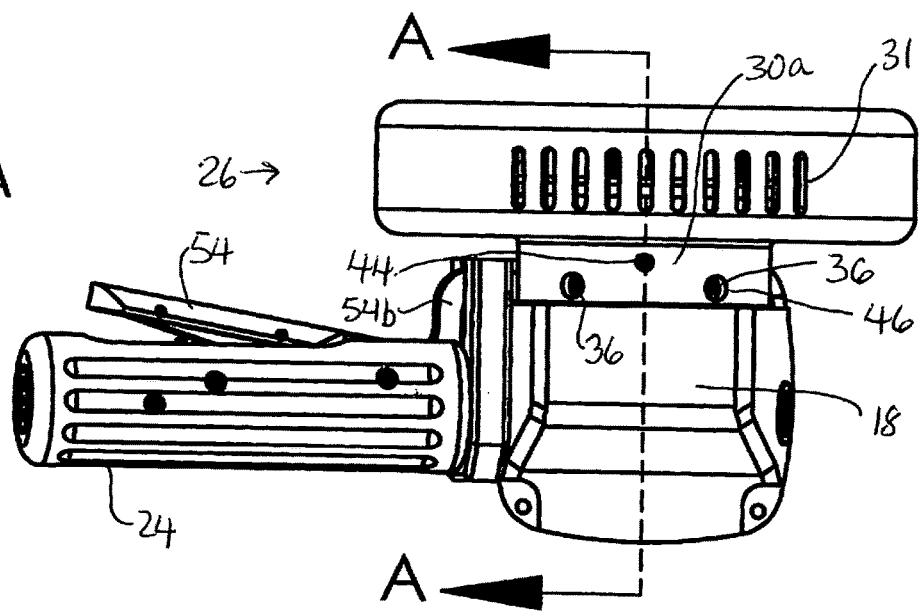
FIG. 2A is a front view of the power tool and guard mechanism of FIG. 1B.
Figure 2B:
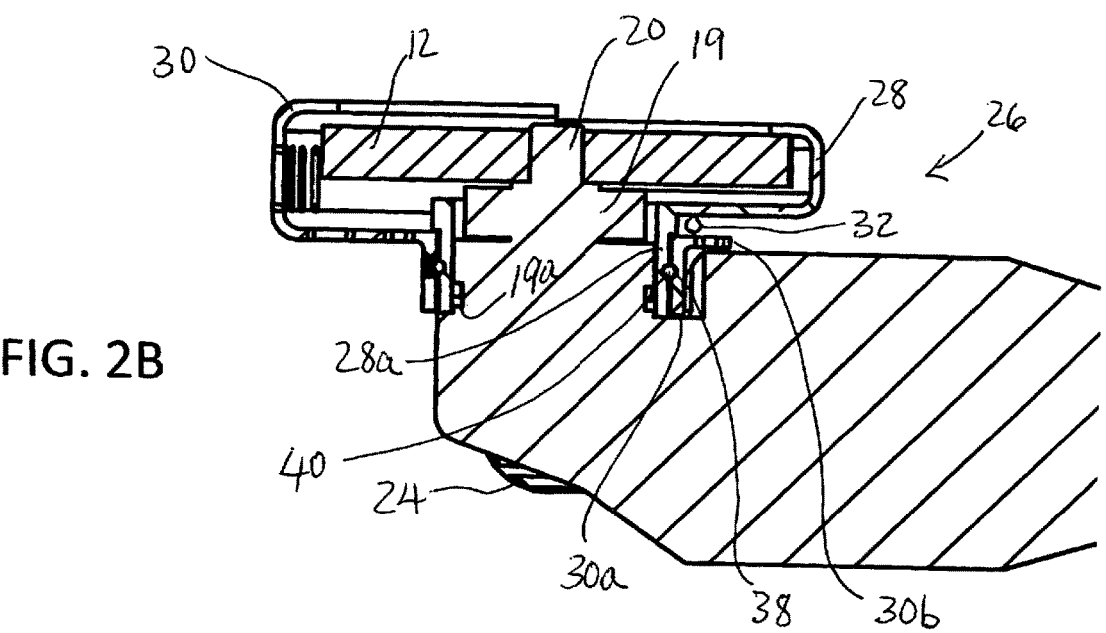
FIG. 2B is a partial cross-sectional view of the power tool and guard mechanism, taken along lines A-A in FIG. 2A.
Figure 7:
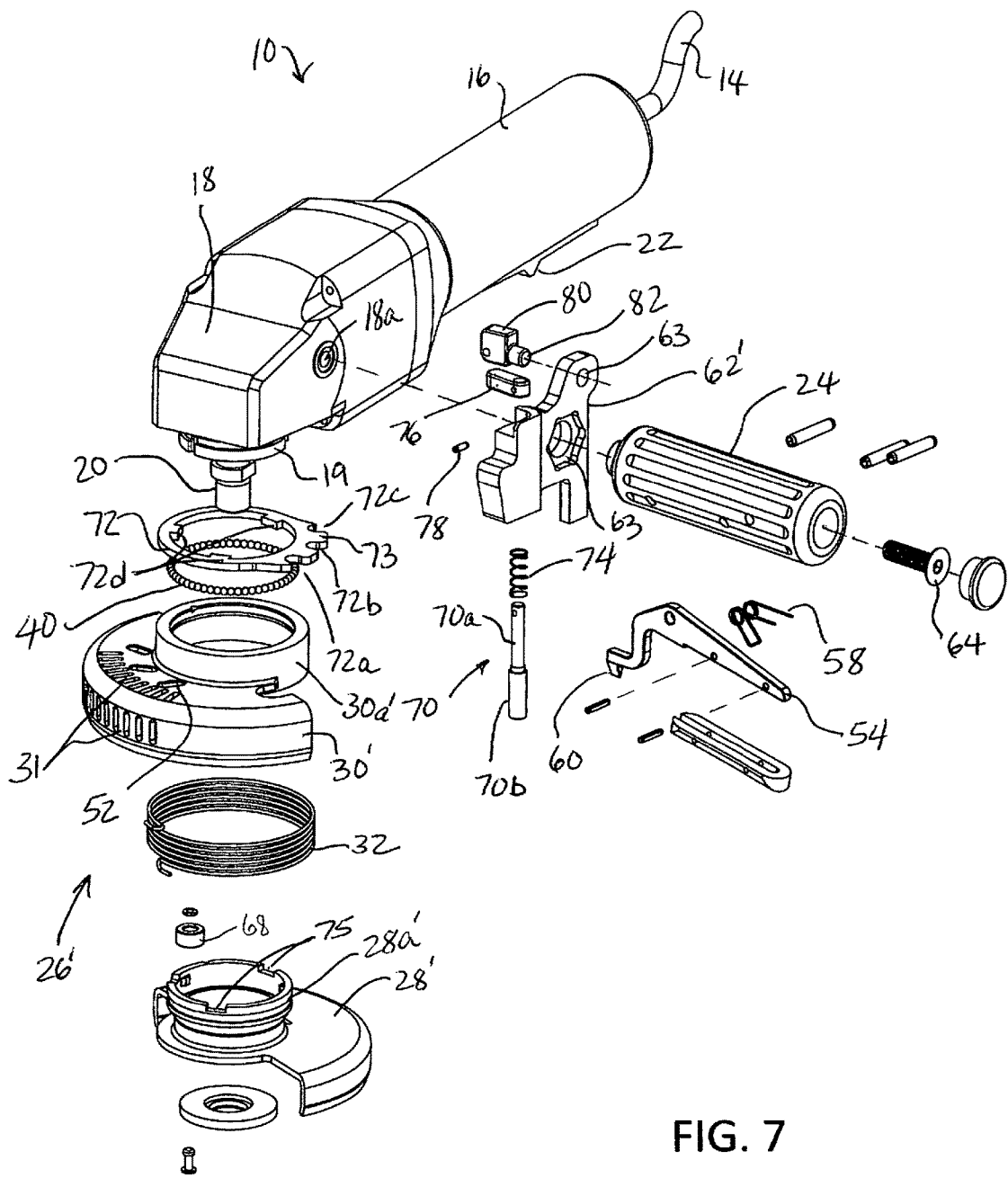
FIG. 7 is an exploded isometric view of the rotary cutting power tool of FIG. 5.

As best seen in FIGS. 2B and 7, the guard mechanism 26 is fastened to the spindle 19 in a way that retains the guard mechanism 26 on the spindle 19, while allowing the guard mechanism 26 to rotate with respect to the spindle 19. To this end, the spindle 19 is provided with a circumferential undercut or recess 19a, and the inner or fixed guard portion 28 is provided with a tubular collar 28a having a set of inwardly depending tabs 28b that extend into the recess 19a. The interface between the tabs 28b and the recess 19a retain the guard mechanism 26 on the spindle 19 while permitting rotation of the guard mechanism 26 with respect to the spindle 19. The periphery of the spindle 19 has a set of axial grooves (not shown) that terminate in the recess 19a, and the tabs 28b must be aligned with the axial grooves to install or remove the guard mechanism 26. In use, the guard mechanism 26 is rotated to a desired position, and then locked in place by a locking mechanism, described below.

Figure 1B:
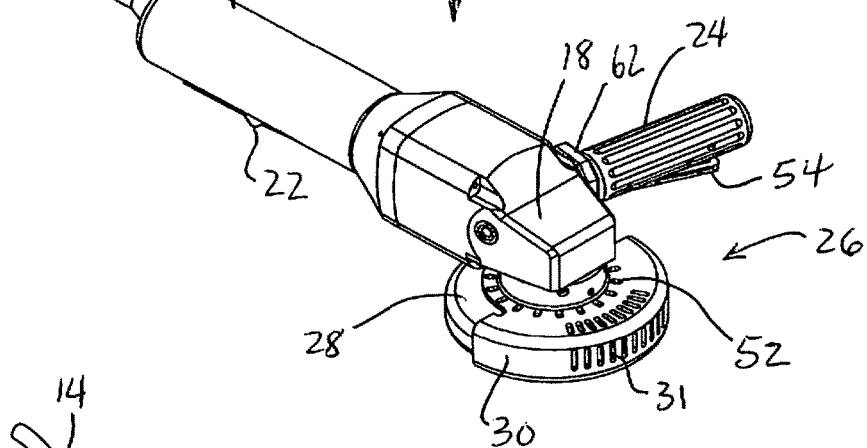
FIG. 1B is an isometric view of rotary cutting power tool of FIG. 1A, but with the retractable portion of the guard mechanism in its default or un-retracted position.
Figure 1C:
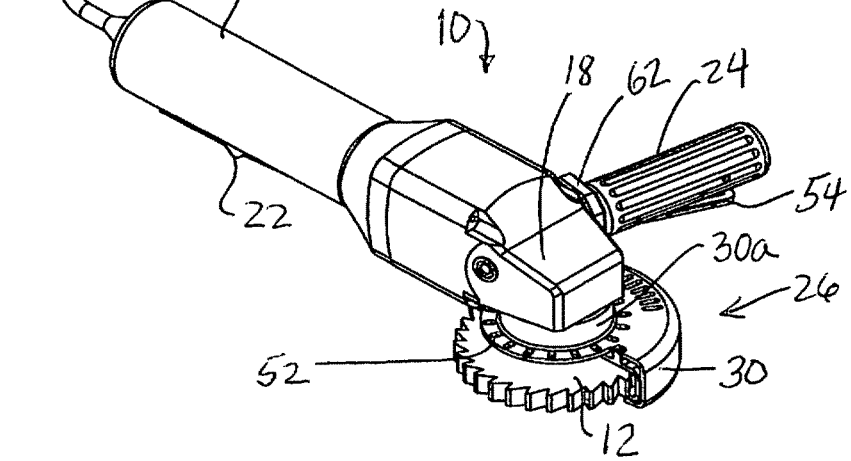
FIG. 1C is an isometric view of rotary cutting power tool of FIG. 1A, but with the guard mechanism rotated clockwise by ninety degrees.

As mentioned above, and described below, the retractable guard portion 30 is rotatably mounted on the fixed guard portion 28. An internal return spring 32 (such as an extension or torsion spring) couples the guard portions 28 and 30, and biases the retractable guard portion 30 to a default position enclosing its half of the cutting element 12, as depicted in FIG. 1B. A rubber bumper 68 (see FIG. 6) riveted to the upper face of the fixed guard portion 28 prevents the return spring 32 from rotating the retractable guard portion 30 beyond the default position. However, the retractable guard portion 30 may be rotated against the bias force of return spring 32 to partially or fully expose the its half of the cutting element 12, as depicted FIGS. 1A and 1C. Retraction of the guard portion 30 can occur automatically during operation of the power tool when the leading edge of the guard portion 30 contacts a workpiece, or manually when the power tool 10 is off, and a guard latch mechanism 50 (described below) can be actuated by the user to temporarily hold the retractable portion 30 of the guard mechanism 26 in a partially retracted or fully retracted position. For example, FIGS. 1A and 1C depict the retractable portion 30 of the guard mechanism 26 in a fully retracted position.

Advantageously, user actuation of the guard latch mechanism 50 requires the user to grasp the auxiliary handle 24; once the user releases the auxiliary handle 24, the guard latch mechanism 50 will also release, allowing the bias force of return spring 32 to move the guard portion 30 to its closed or un-retracted position, as shown for example in FIG. 1B. This is considered to be advantageous because requiring the user to grasp the auxiliary handle 24 not only helps the user stabilize and accurately control the power tool 10 during plunge cuts, but also keeps both of the user's hands safely away from the exposed cutting element 12 in the event of a sudden kickback.

Another advantageous feature of the guard mechanism 26 is that its rotary orientation with respect to the spindle 19 of the power tool 10 can be selected to accommodate the desired cutting operation without affecting the operation of the guard latching mechanism 50. For example, FIGS. 1A and 1B depict a typical orientation of the guard mechanism 26 in which the fixed guard portion 28 encloses the rear half of the cutting element 12, and the retractable guard portion 30 selectively exposes up to the entire front half of the cutting element 12 (as shown in FIG. 1A). However, if a user desires to cut in a direction other than forward of the power tool 10, the rotary alignment of the guard mechanism 26 may be changed. For example, if the user desires in a direction opposite to that of auxiliary handle 24, the guard mechanism 26 can be oriented as depicted in FIG. 1C.

FIGS. 1-4 depict a first embodiment in which the rotary orientation of the guard mechanism 26 with respect to the spindle 19 can be locked in any desired orientation. On the other hand, FIGS. 5-7 depict a second embodiment in which the rotary orientation of the guard mechanism 26 can be locked in one of several preset orientations. In either case, the selected rotary alignment does not affect the operation of the guard latch mechanism 50.

Referring to the first embodiment, and particularly to FIGS. 2A-2B, the fixed and retractable guard portions 28, 30 have coaxial tubular collars 28a, 30a that axially overlap and fit over the spindle 19. In this embodiment, the rotary orientation of the fixed guard portion 28 can be locked in any desired position, and the locking mechanism for securing the fixed guard portion 28 to the spindle 19 is implemented with a pair of set screws 36 threaded into the collar 28a. When sufficiently tightened, the set screws 36 forcibly engage the spindle 19, preventing further rotation of the fixed guard portion 28 with respect to the spindle 19. As seen in FIG. 2A, the collar 30a of retractable guard portion 30 is provided with openings 46 through which the set screws 36 can be accessed when the retractable guard portion 30 is in the default or un-retracted position. Adjusting the orientation of the guard mechanism 26 as described above is accomplished by loosening the set screws 36 to permit rotation of the guard mechanism 26 to a desired orientation, and then re-tightening the set screws 36.

The collar 30a of the retractable guard portion 30 fits closely over the collar 28a of the fixed guard portion 28, and the adjacent internal faces of the collars 28a and 30a have radially aligned circumferential grooves that form a circular raceway 38 in which are disposed a set of metal ball bearings 40. The ball bearings 40 are placed in the raceway 38 though an opening in the collar 30a, and the opening is then closed by a plug 44.

Although angle grinder power tools such as depicted are customarily or optionally equipped with an auxiliary or dead handle 24 as shown to help the user stabilize and accurately control the power tool 10, the auxiliary handle 24 is additionally used, according to this invention, to allow the user to selectively latch the movable portion 30 of the guard mechanism 26 in a partially or fully retracted position. And the latch control elements are designed such that the user must be grasping the auxiliary handle 24 in order to retain the second portion 30 in a retracted position, which keeps both of the user's hands safely away from the exposed portion of cutting element 12 in the event of a sudden kickback.

Figure 3A:
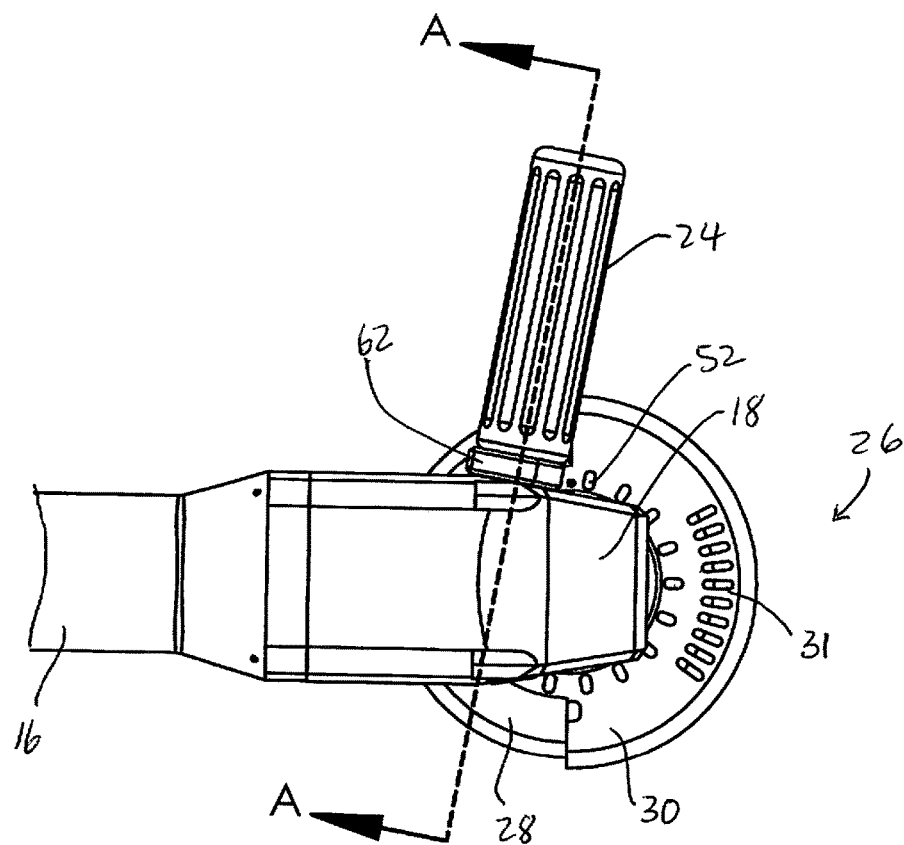
FIG. 3A is a top view of the power tool and guard mechanism of FIG. 1B.
Figure 3B:
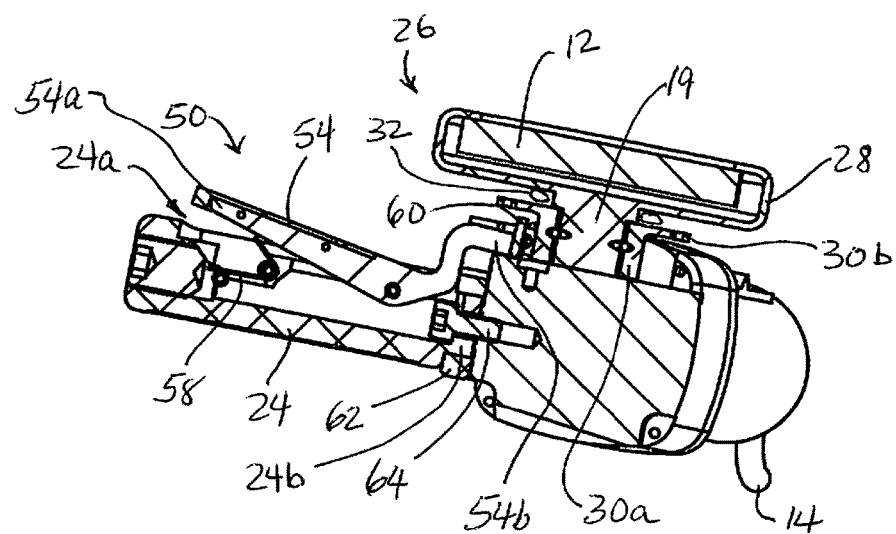
FIG. 3B is a cross-sectional view of the power tool and guard mechanism, taken along lines A-A in FIG. 3A.
Figure 4:
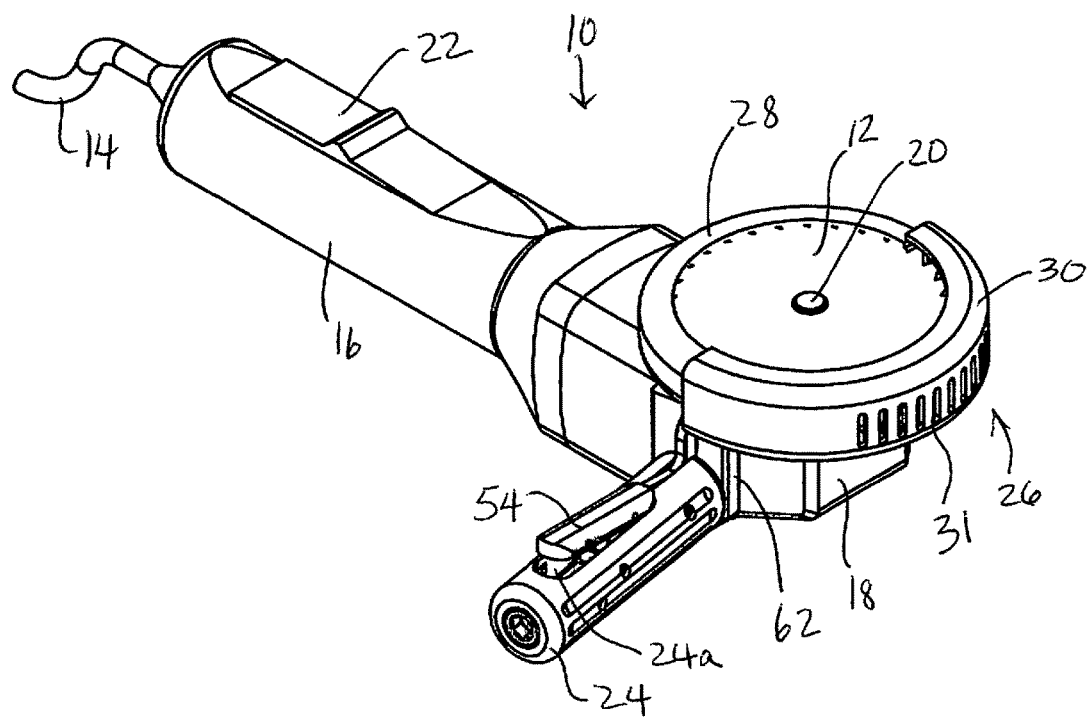
FIG. 4 is a partial isometric view of the underside of the power tool and guard mechanism of FIG. 2B.
Figures 5, 6:
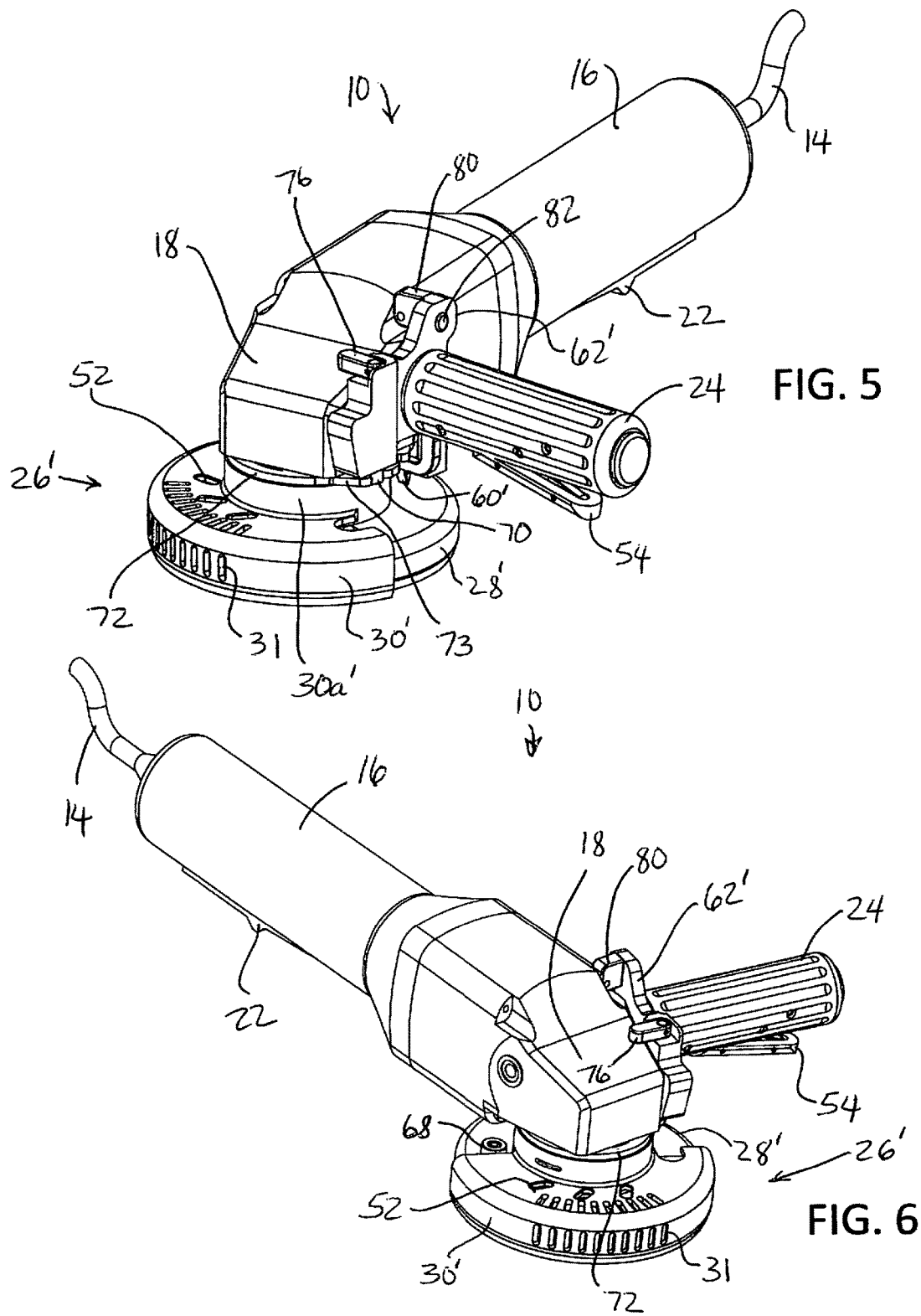
FIG. 5 is a first isometric view of rotary cutting power tool equipped with a guard mechanism and control apparatus according to a second embodiment of the invention, with the retractable portion of the guard mechanism in its default or un-retracted position.
FIG. 6 is a second isometric view of the rotary cutting power tool of FIG. 5.

Referring to FIGS. 3A-3B and 4, the control apparatus for latching the movable portion 30 of guard mechanism 26 in a retracted position is generally designated by the reference numeral 50. The control apparatus 50 includes an arcuate array or series of openings 52 formed in the upper face of the movable guard portion 30 adjacent its tubular collar 30a, a user-manipulated control lever 54 pivotably mounted within the auxiliary handle 24 on a rolled pin 56 disposed intermediate its inboard and outboard ends, and a torsion spring 58 mounted within the auxiliary handle 24 for establishing a default position of the control lever 54. As best seen in FIG. 4, the outboard end 54a of the control lever 54 protrudes through a slot opening 24a in the underside of the auxiliary handle 24 for manipulation by the tool user, and the torsion spring 58 urges the outboard end of control lever 54 away from the auxiliary handle 24. When the user grips the auxiliary handle 24 and depresses the outboard end of the control lever 54 against the bias force of spring 58, a post 60 on the inboard end 54b of the control lever 54 moves toward and through one of the openings 52 in the upper face of the movable guard portion 30. Preferably, the surface of auxiliary handle 24 surrounding the slot 24a is recessed as shown in FIG. 4 to accommodate the outboard end 54a of the control lever 54 when depressed.

When the power tool 10 is turned off and the cutting element 12 is stationary, the user can manually retract the movable portion 30 of the guard mechanism 26 to a desired position, and then depress the control lever against the auxiliary handle 24 to latch the movable portion 30 in the desired position. Since the cutting element cannot be easily seen when the movable portion 30 is in its default (closed) position, the movable portion 30 is provided with a series of viewing slots 31 through which the user can view the cutting element 12 and verify that it is indeed stationary before manually retracting the movable portion 30. But once the movable portion 30 is manually retracted to the desired position, depressing the outboard end of the control lever 54 in opposition to the bias of torsion spring 58 lowers the post 60 into an aligned opening 52 in the upper face of guard portion 30. The user can then release the movable guard portion 30, and the control apparatus 50 will retain it in the desired retracted position during subsequent operation of the power tool 10. But as soon as the user releases the auxiliary handle 24 (whether the power tool 10 is on or off), the outboard end of the control lever 54 returns to its default position under the bias of spring 58, retracting the post 60 from the guard member opening 52, and allowing the return spring 32 to return the movable portion 30 of the guard mechanism 26 to its default position depicted in FIG. 1B. As best seen in FIGS. 1A-1C, the upper face of movable guard portion 30 includes a flange 30b on its rear surface so that the openings 52 encircle the collar 30a to ensure that this latching function of control lever 54 will work as described, regardless of the rotary orientation of the guard mechanism 26.

Referring particularly to FIG. 2A and 3B, the auxiliary handle 24, with the installed control lever 54 and spring 58, are fastened to the front housing 18 of the power tool 10 via an intervening rectangular mounting plate 62. The primary function of the mounting plate 62 is to prevent rotation of the auxiliary handle 24 (and hence, the control lever 54) relative to the power tool's front housing 18. As best seen in the exploded view of FIG. 7, this is achieved by providing a non-circular (hexagonal, for example) mounting opening 63 in the upper end of the mounting plate 62, and providing the inboard end 24b of the auxiliary handle 24 with a complementary peripheral surface. The inboard end 24b of the auxiliary handle 24 is received within the opening in the upper end of the mounting plate 62, and both pieces are fastened to the front housing 18 of the power tool 10 with a bolt 64 seated in the bore of the auxiliary handle 24. A secondary mounting bolt (not shown) coupling the mounting plate 62 to the front housing 18 prevents the mounting plate from rotating with respect to the housing 18. A secondary function of mounting plate 62 is to support the control lever 54 from any side loading that might occur; to this end, the mounting plate 62 is bifurcated at its lower extremity, and the control lever 54 passes through the slot legs intermediate its inboard and outboard ends, as seen in FIG. 2A.

This mounting arrangement also decouples the auxiliary handle 24 and its control lever 54 from the guard mechanism 26 when the control lever 54 is in its default position, allowing the movable guard portion 30 to rotate relative to the control lever 54, and also allowing the entire guard mechanism 26 to be rotatably adjustable relative to the control lever 54 to suit a given cutting operation, as mentioned above, without affecting the above-described guard latching functionality.

Turning now to FIGS. 5-7 and second embodiment of this invention, the elements that correspond but differ from those of the first embodiment are designated by primed like reference numerals. For example, the guard mechanism is generally designated by the reference numeral 26', and the fixed and retractable guard portions are designated by the reference numerals 28' and 30', respectively. As mentioned above, the main functional difference between the two embodiments is that the rotary orientation of the guard mechanism 26' can be locked in one of limited number of preset positions. While this limits the way the guard mechanism 26' can be used, it allows a locking mechanism that is more robust than the set screws 36 of the first embodiment, and allows the user to make deeper plunge cuts with the cutting element 12. Another difference, albeit incidental, is that the guard mechanism 26' of the second embodiment is configured so that its retractable guard portion 30' retracts through counter-clockwise rotation (when viewed from above as in FIGS. 5-6), as opposed to the clockwise rotation of the retractable guard portion 30 of the first embodiment.

In general, the rotary alignment of the guard mechanism 26' is determined by a user-manipulated alignment pin 70 that engages one of several slots 72a, 72b, 72c formed in an alignment ring 72 fastened to the fixed guard portion 28'. The slots 72a, 72b, 72c are formed in a laterally depending shoulder 73 of alignment ring 72, and the alignment pin 70 is slidably mounted in the mounting plate 62' above the slots 72a, 72b, 72c. The user can change the alignment of the guard mechanism 26' by temporarily lifting the alignment pin 70 out of engagement with the alignment ring 72, rotating the guard mechanism 26', and then engaging the alignment pin 70 with a different alignment ring slot 72a, 72b, 72c. Of course, the number and location of the alignment ring slots 72a, 72b, 72c could be different than shown.

The alignment ring 72 is disposed between the spindle 19 of the power tool 10 and the collar 30a' of the retractable guard portion 30'. Referring to the exploded view of FIG. 7, the alignment ring 72 has a set of inwardly depending tabs 72d that engage a corresponding set of slots 75 formed in the upper face of the collar 28a' of the fixed guard portion 28'. This rotationally locks the alignment ring 72 to the fixed guard portion 28'.

The alignment pin 70 has a stepped diameter, the smaller upper portion 70a of which is slidably received in an axial bore (not shown) of the mounting plate 62'. A bias spring 74 encircling the upper portion 70a of the alignment pin 70 biases the alignment pin 70 downward toward the alignment ring 72, and its downward travel is limited by a cap 76 fastened to the upper end of alignment pin 70 by a press-fit pin 78. The user can lift the alignment pin 70 out of engagement with the alignment ring 72 by lifting upward on the cap 76, and the upward travel of alignment pin 70 is limited by interference between the larger lower portion 70b of the alignment pin 70 and the axial bore in which the smaller upper portion 70a is slidably received.

As with the mounting plate 62 of the first embodiment, the mounting plate 62' is primarily secured to the front housing 18 of the power tool 10 along with the auxiliary handle 24 by a bolt 64 seated in the bore of the auxiliary handle and threaded into an opening 18a in the front housing 18. However, the mounting plate 62' is additionally coupled to the motor housing 16 with a pivot coupling 80. The pivot coupling 80 is rigidly fastened (bolted, for example) to the motor housing 16, and includes an outwardly depending pivot pin 82 that is received in an opening 63 in the mounting plate 62'. This mounting arrangement allows a slight rotation of the mounting plate 62' about the pivot pin 82 to help absorb the force applied to alignment pin 70 and mounting plate 62' upon abrupt closure of the retractable guard portion 30'.

If, as in the illustrated second embodiment, the alignment ring slots 72a, 72b, 72c are in relatively close proximity, the upper face of the retractable guard portion 30' does not need or include a rearward facing flange to accommodate openings 52 for engagement by the post 60 of control lever 54. And significantly, this lack of a rearward facing flange permits deeper plunge cutting. And of course, the number of openings 52 in the retractable guard portion may be different than shown.

In summary, the improved guard and guard control apparatus of the present invention safely allows a user of a rotary cutting power tool to maintain the retractable portion of a cutting element guard in the retracted position during operation of the power tool in a way that necessarily occupies both hands of the user. This not only helps the user stabilize and accurately control the power tool, but also keeps both of the user's hands safely away from the exposed cutting element in the event of a sudden kickback. The various elements of the guard control apparatus may be constructed of metal or plastic, as appropriate, and of course, it will be recognized that while the invention has been described in reference to the illustrated embodiment, numerous modifications and variations in addition to those mentioned herein will occur to those skilled in the art, and still fall within the intended scope of the invention. For example, the control lever 54 of auxiliary handle 24 may be replaced with a button-activated mechanism, and so forth.

The invention claimed is:

1. A guard and guard control apparatus for a rotary cutting power tool, where the power tool includes a housing, a housing-mounted on/off switch that can be activated when a user grasps the housing, a rotary cutting element, and a spindle surrounding a drive shaft on which said rotary cutting element is mounted, the guard and guard control apparatus comprising:

a guard mechanism at least partially enclosing said cutting element, including a first guard member rotatably mounted on said spindle and enclosing a first portion of said cutting element, a retractable guard member rotatably supported on said first guard member and selectively enclosing a second portion of said cutting element, and a return spring that biases the retractable guard member toward an un-retracted position that fully encloses the second portion of said cutting element, where said first guard member includes an inner tubular collar disposed about and retained on said spindle, and said retractable guard member includes an outer tubular collar that axially overlaps the inner tubular collar of said first guard member;

a locking mechanism for rotationally locking said first guard member in one of a preset number of rotary orientations, including an alignment ring fastened to the inner tubular collar of said first guard member for rotation therewith, said alignment ring having a laterally depending shoulder in which are formed a preset number of slots corresponding to said preset number of rotary orientations, and an alignment pin supported with respect to said housing that engages a selected one of the alignment ring slots to rotationally lock said first guard member in a preset rotary orientation corresponding to said selected alignment ring slot;

an auxiliary handle affixed to the housing of the power tool and grasped by the user to stabilize said power tool; and control apparatus including a spring-biased member on the auxiliary handle that is depressed by the user when the user grasps the auxiliary handle, and latching elements linking said spring-biased member to the retractable guard member so as to hold the retractable guard member in a desired retracted position so long as said user continues to depress said spring-biased member by grasping said auxiliary handle, and to allow the retractable member to return to the un-retracted position under the bias of said return spring when the user releases the auxiliary handle and said spring-biased member.

2. A guard and guard control apparatus for a rotary cutting power tool, where the power tool includes a housing, a housing-mounted on/off switch that can be activated when a user grasps the housing, a rotary cutting element, and a spindle surrounding a drive shaft on which said rotary cutting element is mounted, the guard and guard control apparatus comprising:

a guard mechanism at least partially enclosing said cutting element, including a first guard member rotatably mounted on said spindle and enclosing a first portion of said cutting element, a retractable guard member rotatably supported on said first guard member and selectively enclosing a second portion of said cutting element, and a return spring that biases the retractable guard member toward an un-retracted position that fully encloses the second portion of said cutting element;

a locking mechanism for rotationally locking said first guard member in one of a preset number of rotary orientations, including an alignment ring fastened to said first guard member for rotation therewith, said alignment ring having a laterally depending shoulder in which are formed a preset number of slots corresponding to said preset number of rotary orientations, and an alignment pin supported with respect to said housing that engages a selected one of the alignment ring slots to rotationally lock said first guard member in a preset rotary orientation corresponding to said selected alignment ring slot;

an auxiliary handle affixed to the housing of the power tool and grasped by the user to stabilize said power tool;

a mounting plate disposed between said auxiliary handle and the housing of said power tool, said mounting plate having a bore in which said alignment pin is slidably received; and control apparatus including a spring-biased member on the auxiliary handle that is depressed by the user when the user grasps the auxiliary handle, and latching elements linking said spring-biased member to the retractable guard member so as to hold the retractable guard member in a desired retracted position so long as said user continues to depress said spring-biased member by grasping said auxiliary handle, and to allow the retractable member to return to the un-retracted position under the bias of said return spring when the user releases the auxiliary handle and said spring-biased member.

3. The guard and guard control apparatus of claim 2, further comprising:

a bias spring disposed in said mounting plate that biases said alignment pin into engagement with the shoulder of said alignment ring; and a user-manipulated cap affixed to said alignment pin for lifting said alignment pin out of engagement with said alignment ring against the bias of said bias spring.

4. The guard and guard control apparatus of claim 2, further comprising:

a pivot coupling rigidly fastened to the housing of said power tool, including a pivot pin received in an opening of said mounting plate to allow slight rotation of said mounting plate about said pivot pin for absorbing force applied to said alignment pin and mounting plate when said retractable member returns to the un-retracted position under the bias of said return spring.

\* \* \* \* \*